(12) United States Patent
Deur

(10) Patent No.: US 7,213,701 B2
(45) Date of Patent: May 8, 2007

(54) CONVEYOR ROLLER AXLE STIFFENER

(75) Inventor: Delwyn G. Deur, Grand Rapids, MI (US)

(73) Assignee: TGW Ermanco Incorporated, Spring Lake, MI (US)

( * ) Notice: Subject to any disclaimer, the term of this patent is extended or adjusted under 35 U.S.C. 154(b) by 168 days.

(21) Appl. No.: 11/049,787

(22) Filed: Feb. 3, 2005

(65) Prior Publication Data

US 2006/0180427 A1    Aug. 17, 2006

(51) Int. Cl.
B65G 13/02    (2006.01)
B65G 13/00    (2006.01)

(52) U.S. Cl. .......................................... 198/780; 193/37

(58) Field of Classification Search ................ 193/37; 198/780; 100/155 R
See application file for complete search history.

(56) References Cited

U.S. PATENT DOCUMENTS

| | | | |
|---|---|---|---|
| 3,599,769 A * | 8/1971 | Gardella | 193/35 R |
| 3,815,196 A * | 6/1974 | Gotham et al. | 193/37 |
| 4,221,288 A | 9/1980 | Rae | |
| 4,264,002 A | 4/1981 | Van Der Schie | |
| 4,264,005 A | 4/1981 | Smock | |
| 4,372,442 A | 2/1983 | Fleischauer | |
| 4,496,257 A * | 1/1985 | Habelt et al. | 400/578 |
| 4,577,747 A | 3/1986 | Martin | |
| 4,681,215 A | 7/1987 | Martin | |
| 4,730,718 A | 3/1988 | Fazio et al. | |
| 4,819,788 A | 4/1989 | Van Der Schie | |
| 4,887,707 A | 12/1989 | Harms | |
| 4,962,841 A | 10/1990 | Kloosterhouse | |
| 5,007,526 A | 4/1991 | Fazzina et al. | |
| 5,042,644 A | 8/1991 | Davis | |
| 5,056,653 A | 10/1991 | Lancaster | |
| 5,261,528 A | 11/1993 | Bouchal | |
| 6,035,998 A | 3/2000 | Garzelloni | |
| 6,113,059 A * | 9/2000 | Couillard | 248/694 |
| 6,685,005 B2 | 2/2004 | Youn | |
| 6,910,571 B1 * | 6/2005 | Ertel | 198/780 |
| 2002/0008007 A1 | 1/2002 | Thomas et al. | |
| 2002/0134643 A1 | 9/2002 | Schmale et al. | |

\* cited by examiner

*Primary Examiner*—Gene O. Crawford
*Assistant Examiner*—Leslie A. Nicholson, III
(74) *Attorney, Agent, or Firm*—Cook, Alex, McFarron, Manzo, Cummings & Mehler, Ltd.

(57) ABSTRACT

A roller for a conveyor that includes an elongated stationary axle adapted to be mounted between the opposed side plates of the conveyor. A hollow cylindrical shell having a first diameter is mounted for rotation with respect to the axle. An axle support is provided that includes an inner portion having a cross-sectional shape complimentary to the cross-sectional shape of the stationary axle and an outer portion with a cross-sectional size and shape so as to define a space between the shell and the outer portion of the axle support. A plurality of webs connect the inner portion to the outer portion.

2 Claims, 2 Drawing Sheets

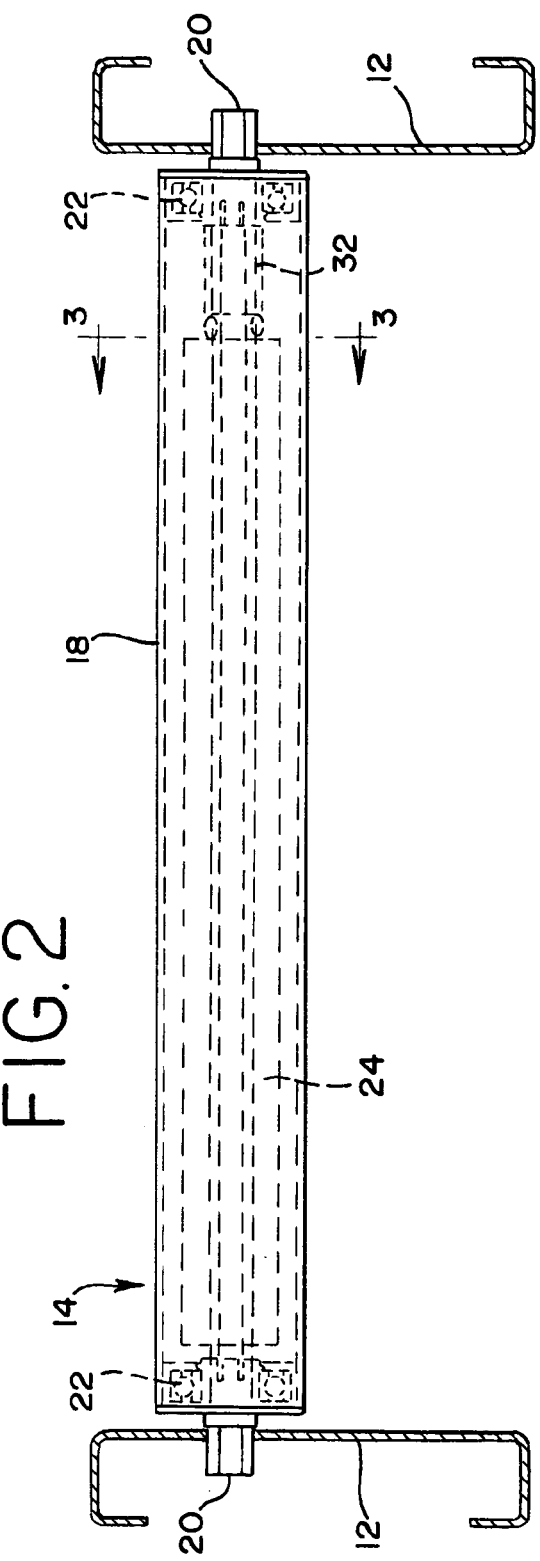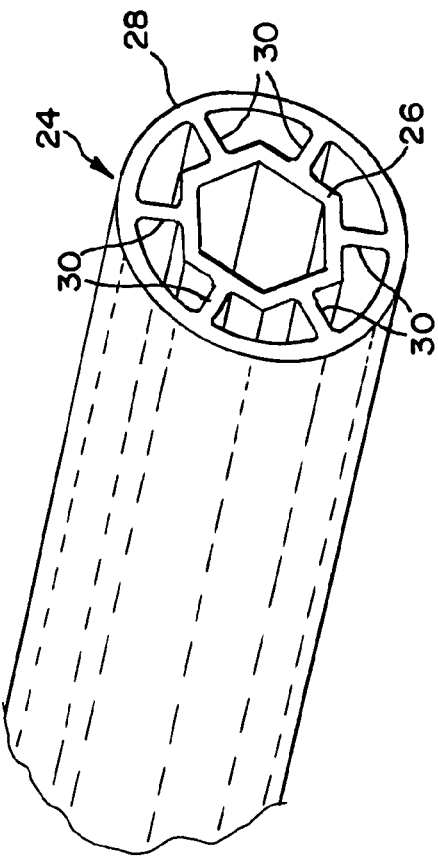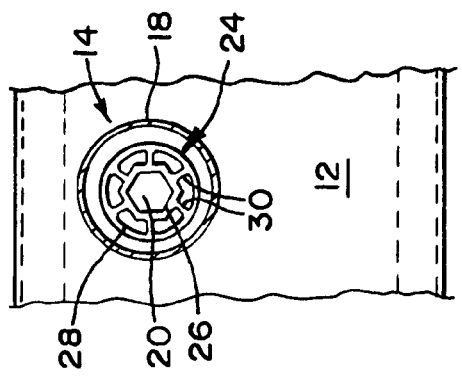

US 7,213,701 B2

CONVEYOR ROLLER AXLE STIFFENER

The present invention relates to a roller for a conveyor and, more particularly, to a reinforcement member for the axle of the roller.

BACKGROUND OF THE INVENTION

Conveyors utilizing live rollers that rotate about a fixed axle are known in the art. The rollers may be rotated by, e.g., a belt that engages the outer surface of the rollers (see, U.S. Pat. No. 6,685,005), by a rotating line shaft operatively connected to the rollers by O-rings (see U.S. Pat. No. 5,042,644), or by internal motors.

Some rollers for roller conveyors utilize a stub shaft axle at each end for the fixed axle. See, e.g., U.S. Pat. No. 4,681,215, which discloses a conveyor roller rotatable about a pair of fixed stub axles, each axle having a pair of self-aligning bearing assemblies associated therewith.

However, advantages accrue to conveyor rollers that utilize a single axle that extends the full-width of the roller and whose ends are mounted in the side frame members of the conveyor. Specifically, a full-width axle may be spring loaded in order to facilitate quicker removal and installation. Also, a full-width axle requires only a single roller bearing assembly per side, while the use of stub shafts normally requires two bearing assemblies per side.

Full-width axles do, however, entail certain potential disadvantages. Such full-width axles may tend to sag or bow in the middle, the degree to which this occurs being a function of the length of the axle. The bowing causes misalignment of the ends of the axle with respect to their bearings, cocking the inner bearing race, and pinching the ball bearings between the inner and outer races of the bearing assembly, thus exacerbating the wear on the bearings. Consequently, the capacity of the roller conveyor dramatically decreases as the width of the rollers increases.

This is particularly problematic in the context of a belt conveyor, where it is highly desirable to have a small diameter end pulley to minimize the gap between the conveyor beds and to minimize transition problems from conveyor to conveyor. This is especially important when small packages are being conveyed, as they could fall in the gap between the industry-standard 4 inch diameter pulleys used at transition sections. Presently, in order to avoid this problem, a small, non-powered gap roller is placed between the transition pulleys. However, a small box can stall out or skew, causing problems.

The industry trend is to try to utilize transition rollers having diameters smaller than the standard 4 inches, but there are difficulties. Specifically, when a small diameter is utilized, the bearing used requires a small axle, which cannot take the deflection, especially at widths over 24 inches and at higher belt pulls. To overcome this problem, some have utilized "step shafts," in which the inner part of the axle is a larger diameter of machined steel, and the ends are machined down to fit in the bearing. However, this has proven to be very expensive and not commercially feasible. Others have used solid steel DOM (Drawn Over Mandrel) tubes inside the rollers as axle stiffeners, but at the current price of steel, it is economically impractical.

Accordingly, it is an object of the present invention to provide a conveyor roller with a full-width axle in which the axle does not sag or bow. More specifically, it is an object of the present invention to provide a reinforcing member or sleeve for the axle of a roller conveyor that substantially eliminates sagging or bowing of the axle.

SUMMARY OF THE INVENTION

These objects, as well as others which will become apparent upon reference to the following detailed description of a preferred embodiment and accompanying drawings, are provided in a roller for a conveyor that includes an elongated stationary axle adapted to be mounted between the opposed side plates of the conveyor. A hollow cylindrical shell having a first diameter is mounted for rotation with respect to the axle. An axle support is provided that includes an inner portion having a cross-sectional shape complimentary to the cross-sectional shape of the stationary axle and having an outer portion with a cross-sectional size and shape so as to define a space between the shell and the outer portion of the axle support, with a plurality of webs connecting the inner portion to the outer portion.

BRIEF DESCRIPTION OF THE FIGURES OF THE DRAWINGS

FIG. 2 is an end view of the roller conveyor of FIG. 1, with structure removed to show detail, showing a roller incorporating the present invention.

FIG. 3 is a cross-sectional view taken along line 3—3 of FIG. 2.

FIG. 4 is a perspective view of an axle stiffener according to the present invention.

DETAILED DESCRIPTION

Figure 1:
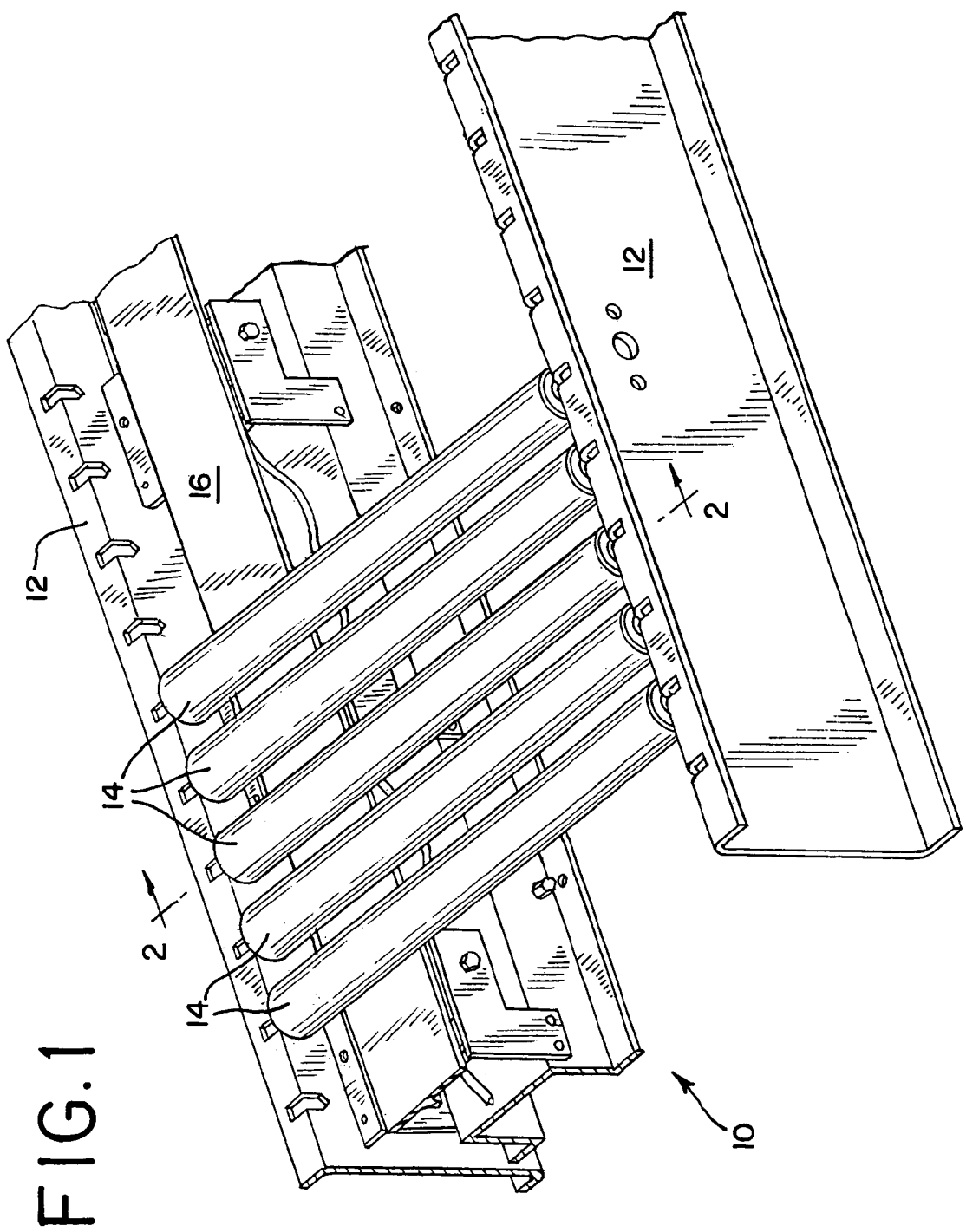
FIG. 1 is a perspective view of a portion of a roller conveyor in which the present invention is suitable for use.

As required, a preferred embodiment of the invention is disclosed herein. However, it is to be understood that the preferred embodiment is merely exemplary of the inventions, which may be embodied in various forms. Therefore, specific details disclosed herein are not to be interpreted as limiting, but merely as a basis for the claims and as a representative basis for teaching one skilled in the art to employ the invention in any appropriate manner.

With reference to FIG. 1, a fragmentary perspective view of a portion of a conveyor system, generally designated 10, is shown. The system 10 includes a pair of parallel frame members 12, between which are supported a plurality of rollers 14. As illustrated, the rollers 14 are driven from underneath by frictional engagement with a moving belt 16. However, as noted above, the rollers could also be driven by a line shaft or internal motors without departing from the scope of the invention.

As best seen in FIG. 2, each roller 14 comprises a cylindrical shell 18. The shell 18 typically has an outside diameter on the order of 2.5 inches, with the wall having a thickness of 11 GA. Each roller 14 also includes a stationary axle 20 that is sized to extend between opposed slots in the frame members 12. The axle 20 is hexagonally-shaped. In practice, the distance between the flats of the axle is $11/16$ inch. Secured to the axle adjacent each end of the axle is a roller bearing 22 that permits the shell 18 to rotate with respect to the axle 20. The roller bearing 22 comprises an inner bearing race secured to the axle 20 and an outer bearing race secured to the shell 18 that permits the shell 18.

In keeping with the invention, an axle support or stiffener 24 is provided that is received on the axle 20 on the interior of the shell 18. The stiffener 24 is preferably made from aluminum by extrusion, and its length should be as long as possible, given the constraints of the length of the shell 18. The stiffener 24 includes an inner portion that has a hexagonal cross-sectional shape that is complimentary to the hexagonal cross-sectional shape of the axle 20, and is sized to closely conform to the axle when received thereon. The stiffener 24 includes an outer portion 28 that has a cross-sectional size and shape that defines a space between the inside diameter of the shell and the outer portion of the axle support. The exterior portion preferably has a circular cross-section with an outside diameter of approximately 1¾ inches. While the outer portion has been shown as having a circular cross-sectional shape, other shapes would be suitable so long as an adequate space is maintained between the inside of the shell and the outside of the outer portion. A web 30 connects each face of the hexagonally-shaped inner portion 26 to the outer portion.

As illustrated, a spring 32 is received on the axle 20 between one end of the stiffener 24 and its adjacent roller bearing. This spring 32 prevents the stiffener from moving axially with respect to the axle 20.

The stiffener 24 exhibits very high beam strength and torsional resistance. Thus, the axle is kept straight, regardless of the conveyor width, and the conveyor can operate at its full-rated capacity.

Thus, by means of the present invention, one is able to use the small diameter roller at an economical price. The invention permits the commonly-used roller in the industry (i.e., one having a 2.5 inch diameter, 11 Ga. shell with a ¹¹⁄₁₆ inch hex axle, as described above) and, through the special stiffening cross-section, make it capable of widths up to 46 inches wide with a full 500 lbs. of belt pull. In addition, the stiffening section is very low cost compared to solid steel, as it uses aluminum and relies on its unique geometric shape to provide the rigidity, making the roller price competitive, especially when combined with the low cost components of the common, high volume 2.5 inch diameter roller.

By way of example, the stiffening section of the present invention allows the use of a small diameter roller that will take the full 500 lbs. of belt pull over all widths of up to 46 inch at less than half of the cost of old 4 inch diameter pulleys.

While the invention has been described in terms of a preferred embodiment, numerous modifications may be made by those skilled in the art without departing from the spirit and scope of the invention. Thus, there is no intent to limit the invention to the same. Instead, the invention is defined by the scope of the following claims.

What is claimed is:

1. A roller for a conveyor comprising:
   an elongated stationary axle having opposed ends and adapted to be mounted between opposed side plates;
   a bearing mounted to the axle adjacent each end;
   a hollow cylindrical shell mounted to the bearings for rotation with respect to the axle; and
   a separate stationary axle support carried on the axle intermediate the bearings comprising an inner portion having a cross-sectional shape complimentary to the cross-sectional shape of the stationery axle and an outer portion having a cross-sectional size and shape so as to define a space between the shell and the outer portion of the axle support, and a plurality of webs intermediate the bearings connecting the inner portion to the outer portion.

2. The roller of claim 1 wherein the axle has an hexagonal cross-sectional shape.

* * * * *